June 28, 1932.  H. A. GRANT  1,865,368
PASTRY PERFORATOR
Filed March 17, 1931
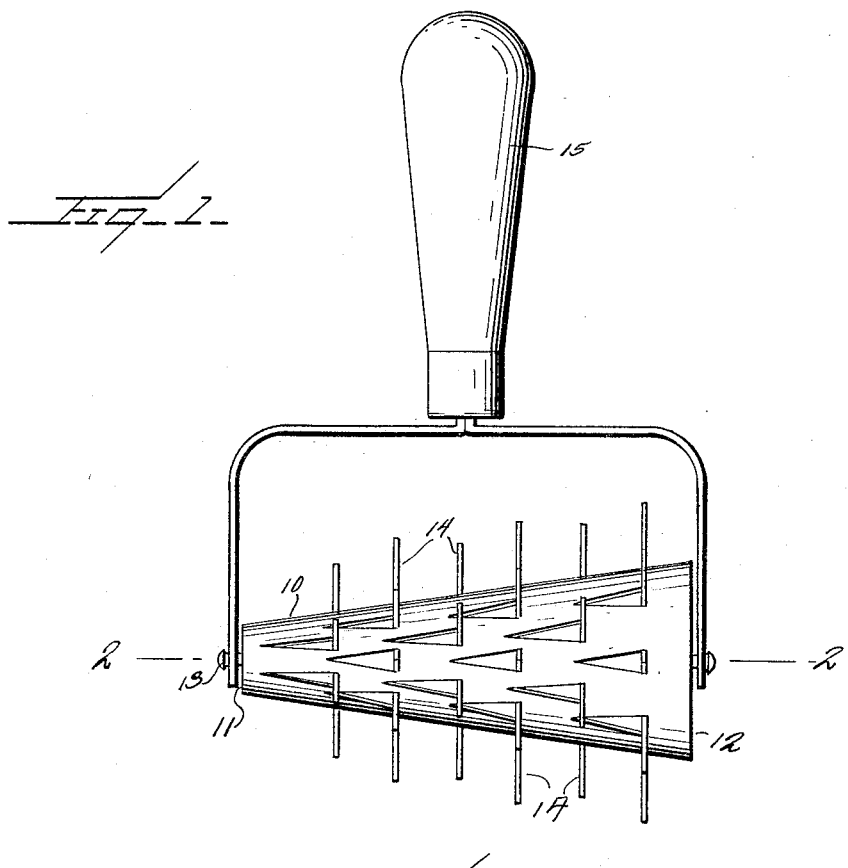
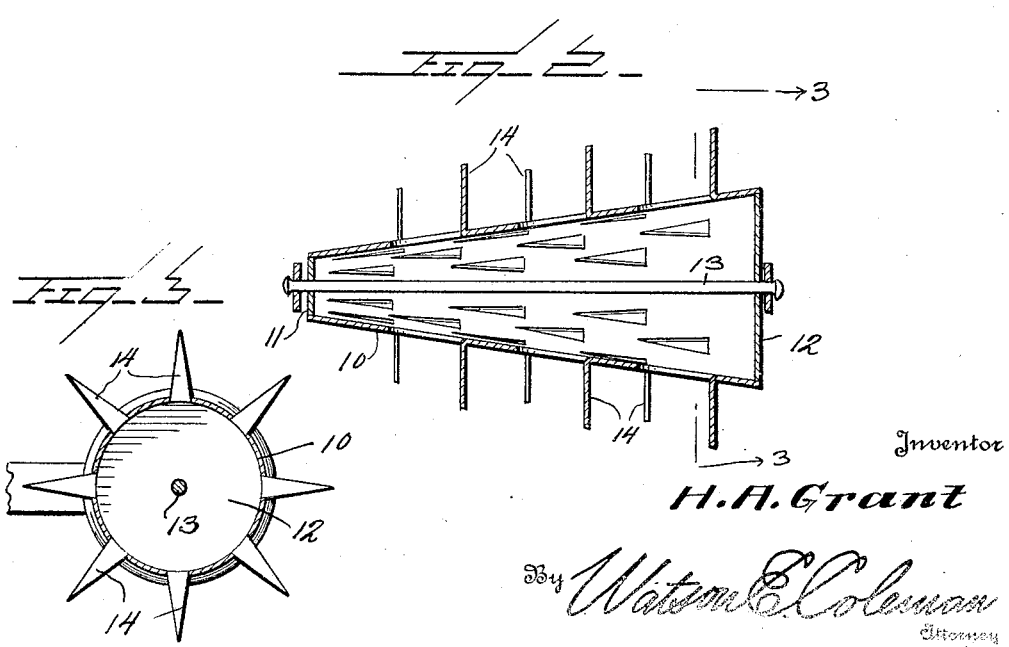
Inventor
H. A. Grant Patented June 28, 1932

1,865,368

UNITED STATES PATENT OFFICE

HELEN A. GRANT, OF PRESCOTT, ARIZONA

PASTRY PERFORATOR

Application filed March 17, 1931. Serial No. 523,338.

This invention relates to kitchen utensils or implements, and more particularly to utensils adapted for use with pastry or the like.

An object of this invention is to provide a device of this kind which is adapted to be used in pie making or the like, so as to eliminate the necessity of puncturing the cover for the pie so as to relieve the air pressure within the pie upon baking thereof.

Another object of this invention is to provide a crust puncturing member which is so constructed as to readily puncture the top of the pie prior to the baking thereof so that when the pie is baked, the crust will be relatively smooth and flat and the punctures made by the implement closed during the baking process.

A further object of this invention is to provide a relatively simple device of this kind by means of which the pie crust or cover can be punctured in a relatively short time, the punctures being of such configuration that they will readily close during the baking process.

The above and various other objects and advantages of this invention will in part be described in and in part be understood from the following detailed description of the present preferred embodiment, the same being illustrated in the accompanying drawing, wherein:—

Figure 1 is a detail side elevation of a device constructed according to the preferred embodiment of this invention;

Figure 2 is a sectional view taken on the line 2—2 of Figure 1, and

Figure 3 is a fragmentary sectional view taken on the line 3—3 of Figure 2.

Referring to the drawing wherein like numerals of reference designate corresponding parts throughout the several views, the numeral 10 designates generally a crust piercing or puncturing member, which in the present instance, is of frusto-conical construction and provided at each end thereof with end plates 11 and 12, the plate 11 being disposed on the small end of the frustro-conical member, while the plate 12 is disposed over the base thereof.

The surface of the frustro-conical member 10 is provided with a plurality of outstanding blades or crust piercing members 14 which may be formed by pressing out a portion of the frustro-conical member 10 which may be constructed of sheet metal or the like, this pressed out portion being disposed at substantially right angles to the axis of the member. There are provided a plurality of these crust piercing blades 14 which are of sufficient length so that when the device is rotated about the surface of the pie, the blades 14 will be forced entirely through the crust so as to provide slits or apertures through the crust for relieving the pressure within the pie upon baking thereof.

A shaft 13 is disposed axially through the frustro-conical member 10 and a handle member generally designated as 15, which is provided with forked arms 16, is adapted to engage each end of the shaft 13.

In the use of this device, the apex portion of the device is preferably disposed inwardly of the pie and the base along the periphery thereof whereupon the device may be rotated about the surface of the pie, the rotation of the roller member 10 forcing the blades 14 through the crust of the pie and thereby providing a plurality of apertures to relieve the pressure within the pie upon baking thereof.

It is, of course, understood that while some of the apertures may be closed during the baking of the pie, it is not essential that they be entirely closed as the pressure formed within the pie as by steam or the like during the process of baking will, no doubt, maintain many of the apertures open, but the surface of the top or crust will be relatively flat rather than in bulging or bubble form where the crust is not punctured.

It is, of course, understood that various changes and modifications may be made in the details of construction and design of the above specifically described embodiment of this invention without departing from the spirit thereof, such changes and modifications being restricted only by the scope of the following claims.

I claim:—

1. A pastry cutter of the character described comprising a handle having arms, a roller member, a shaft extending through the member and carried by the handle whereby to rotatably mount the member on the arms, and a plurality of outwardly projecting flat cutter blades disposed radially of said shaft, said blades being integral with the member and having converging cutting edges, said blades also being mounted transversely of the axis of said member.

2. A pastry cutter of the character described comprising a handle, a roller, end plates secured to the ends of said roller, a shaft carried by the handle and extending through the roller whereby to rotatably mount the roller on the handle, and a plurality of spaced cutter blades disposed at substantially right angles to said shaft and mounted on the periphery of said roller and projecting outwardly therefrom, said blades being integral with the roller and being struck from the body thereof, said blades also being mounted transversely of the axis of said roller.

In testimony whereof I hereunto affix my signature.

HELEN A. GRANT.